United States Patent
Katar et al.

(10) Patent No.: US 9,137,004 B2
(45) Date of Patent: Sep. 15, 2015

(54) NEIGHBOR NETWORK CHANNEL REUSE WITH MIMO CAPABLE STATIONS

(71) Applicant: QUALCOMM Incorporated, San Diego, CA (US)

(72) Inventors: Srinivas Katar, Gainesville, FL (US); Hao Zhu, Ocala, FL (US); Deniz Rende, Gainesville, FL (US); Lawrence Winston Yonge, III, Summerfield, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/279,002

(22) Filed: May 15, 2014

(65) Prior Publication Data
US 2015/0172036 A1 Jun. 18, 2015

Related U.S. Application Data

(60) Provisional application No. 61/915,265, filed on Dec. 12, 2013.

(51) Int. Cl.
*H04K 1/10* (2006.01)
*H04L 27/28* (2006.01)
*H04L 5/00* (2006.01)
(Continued)

(52) U.S. Cl.
CPC .............. *H04L 5/0092* (2013.01); *H04B 3/542* (2013.01); *H04B 3/544* (2013.01); *H04L 1/0009* (2013.01);
(Continued)

(58) Field of Classification Search
CPC .... H04B 3/54; H04B 3/32; H04B 2203/5466; H04B 2203/5425; H04B 3/544; H04B 2203/5408; H04B 3/542; H01L 1/0009; H01L 5/0044; H01L 1/0618; H01L 5/0092; H01L 5/006; H01L 5/0096
USPC ............ 375/257, 260; 340/12.32, 13.23, 538; 455/402
See application file for complete search history.

(56) References Cited

U.S. PATENT DOCUMENTS 8,750,392 B2 * 6/2014 Karaoguz et al. ............. 375/257
2008/0273613 A1 11/2008 Kol
(Continued)

FOREIGN PATENT DOCUMENTS

| EP | 2028769 | 2/2009 |
|----|---------|--------|
| EP | 2200184 | 6/2010 |
| EP | 2410665 | 1/2012 |

OTHER PUBLICATIONS

"PCT Application No. PCT/US2014/066069 International Search Report", Feb. 18, 2015, 12 pages.
Finamore, et al., "Advancing Power Line Communication: Cognitive, Cooperative, and MIMO Communication", Sep. 13, 2012, 5 pages.

*Primary Examiner* — Phuong Phu
(74) *Attorney, Agent, or Firm* — DeLizio Law, PLLC

(57) ABSTRACT

Channel reuse may be used so that multiple networks may communicate via a shared powerline communication (PLC) medium. In a PLC network that supports different transmission modes, channel reuse may be improved by determining signal performance metrics associated with the different transmission modes. A transmission mode may be selected to facilitate channel reuse of the PLC medium by the local network and neighbor network. A first device and a second device may belong to a local network that shares the PLC medium with a neighbor network. The transmission mode may be selected based on interference and signal measurements at one or more receivers of the second device. The transmission mode may be selected from a group comprising a 2-stream multi-input multi-output (MIMO) eigen-beamforming transmission mode, a 1-stream MIMO spot-beamforming transmission mode, and a 1-stream single-input-single-output (SISO) transmission mode.

30 Claims, 10 Drawing Sheets

(51) Int. Cl.
*H04B 3/54* (2006.01)
*H04L 1/00* (2006.01)

(52) U.S. Cl.
CPC .............. *H04L 5/006* (2013.01); *H04L 5/0096* (2013.01); *H04B 2203/5408* (2013.01); *H04B 2203/5425* (2013.01); *H04B 2203/5466* (2013.01)

(56) References Cited

U.S. PATENT DOCUMENTS

2011/0069766 A1    3/2011   Takahashi et al.
2014/0348251 A1*   11/2014   Stadelmeier et al. ......... 375/257

* cited by examiner

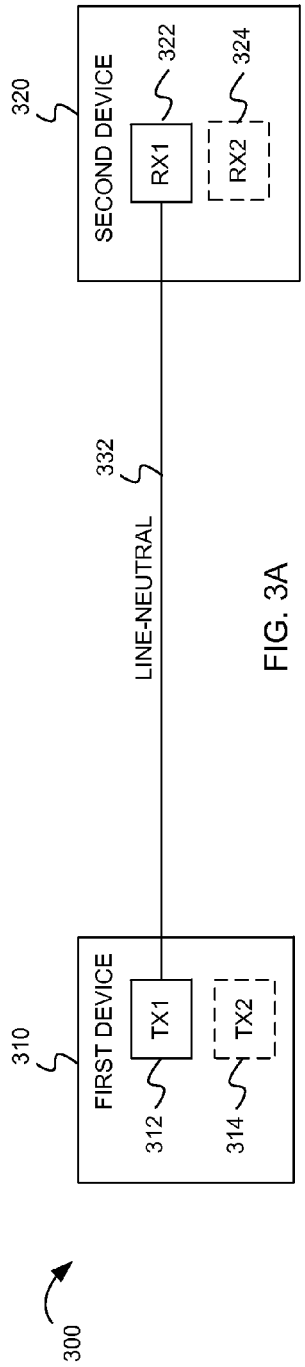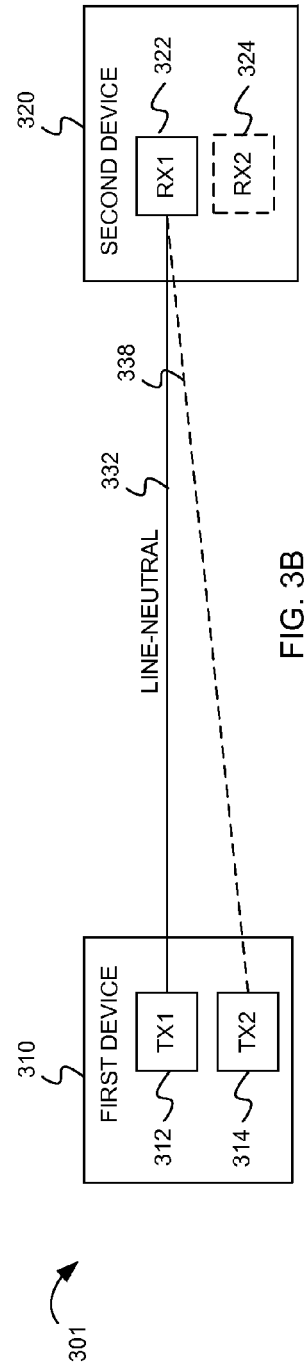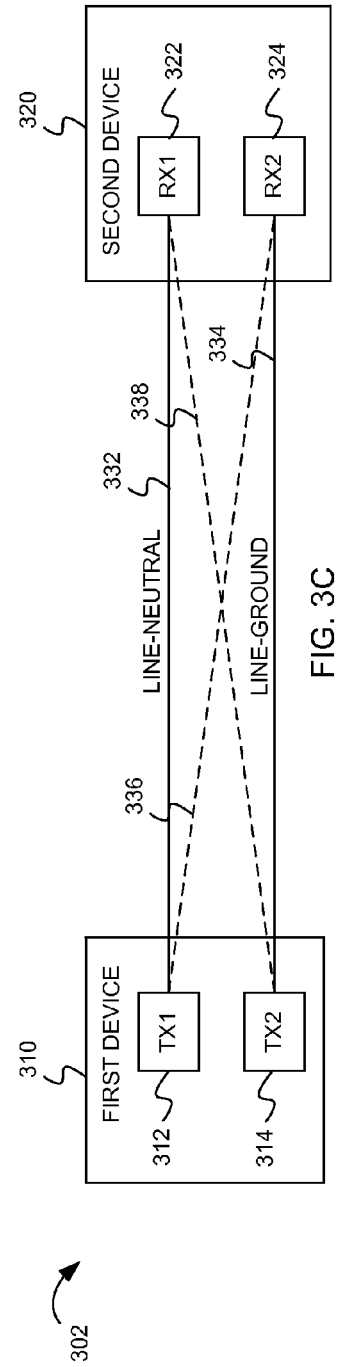

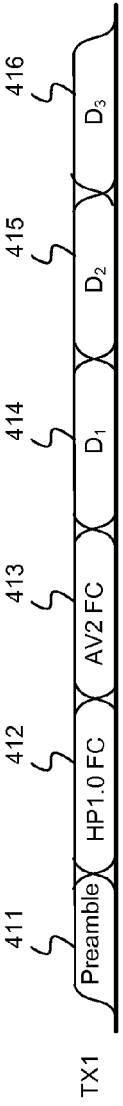
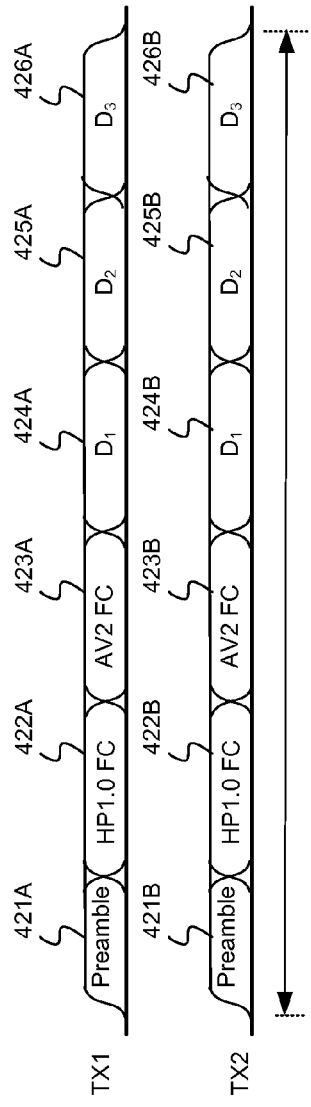
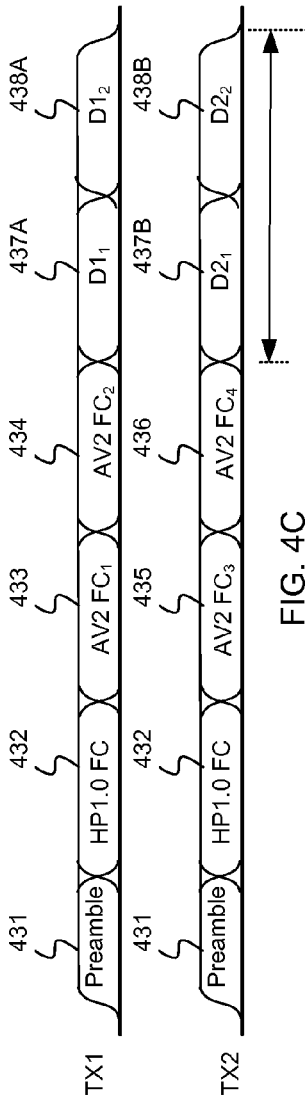
FIG. 4A
FIG. 4B
FIG. 4C

NEIGHBOR NETWORK CHANNEL REUSE WITH MIMO CAPABLE STATIONS

CROSS-REFERENCE TO RELATED APPLICATIONS

This application claims the priority benefit of U.S. Provisional Patent Application Ser. No. 61/915,265, filed Dec. 12, 2013, which is incorporated herein by reference.

TECHNICAL FIELD

Embodiments of the present disclosure generally relate to the field of communication networks, and, more particularly, to a channel reuse mechanism in a communication network that supports multiple-input-multiple-output (MIMO) communications.

BACKGROUND

In many communication systems (e.g., satellite communication systems, wireless communication systems, powerline communication (PLC) systems, coaxial cable communication systems, telephone line systems, etc.), the communication medium can be shared among multiple communication devices. In a shared communication medium, carrier sense multiple access (CSMA) protocols can be employed to minimize interference between communication devices in the shared communication medium. In accordance with the CSMA protocols, a transmitting communication device can "sense" the communication medium and transmit on the communication medium after verifying the absence of other traffic on the shared communication medium. If the channel is currently occupied, the transmitting communication device can defer its transmission until the channel becomes available.

In a shared communication medium, when the interference signal strength (at a receiving device) is small, such that the signal-to-interference-plus-noise ratio (SINR) at the receiving device is high, both a transmitter device and an interfering device may simultaneously transmit data over the same communication channel, thus "reusing" the communication channel. Traditional channel reuse techniques may specify predetermined channel reuse patterns. For example, in accordance with the traditional channel reuse techniques, a channel allocation mechanism can be used to allow spatially separate devices use the same channel at the same time. However, such traditional channel reuse techniques may not fully reuse a communication channel that supports multiple-input multiple-output (MIMO) technology. Communication systems using MIMO technology exploit spatial diversity at the transmitter and at the receiver to increase throughput compared to a single-input single-output (SISO) system.

SUMMARY

Various embodiments are described to facilitate neighbor network channel reuse when one or more devices support MIMO technology. By determining signal performance metrics associated with different transmission modes, including MIMO and SISO transmission modes, a channel reuse determination unit may select a transmission mode that improves neighbor network channel reuse. Channel reuse refers to the concurrent use of the same communication channel by multiple stations. For example, a first network and a second network may share a communication medium. During channel reuse, a station in the first network may transmit at least partially concurrently via the communication medium as another station in the second network.

In one embodiment, a method for managing communication in a powerline communication (PLC) network comprises selecting a transmission mode for a transmission from a first device to a second device via a PLC medium. The first device and the second device may belong to a local network. The transmission mode is selected to facilitate channel reuse of the PLC medium by the local network and a neighbor network. The transmission mode may be selected from a group comprising a 2-stream multiple-input-multiple-output (MIMO) eigen-beamforming transmission mode, a 1-stream MIMO spot beamforming transmission mode, and a 1-stream single-input-single-output (SISO) transmission mode. Other transmission modes or characteristics may be used to facilitate neighbor network channel reuse.

BRIEF DESCRIPTION OF THE DRAWINGS

The present embodiments may be better understood, and numerous objects, features, and advantages made apparent to those skilled in the art by referencing the accompanying drawings.

FIGS. 3A-3C depict various transmission modes which may be selected in accordance with embodiments of this disclosure.

FIGS. 4A-4C depict various protocol data units associated with the transmission modes of FIGS. 3A-3C.

DESCRIPTION OF EMBODIMENT(S)

Figure 1:
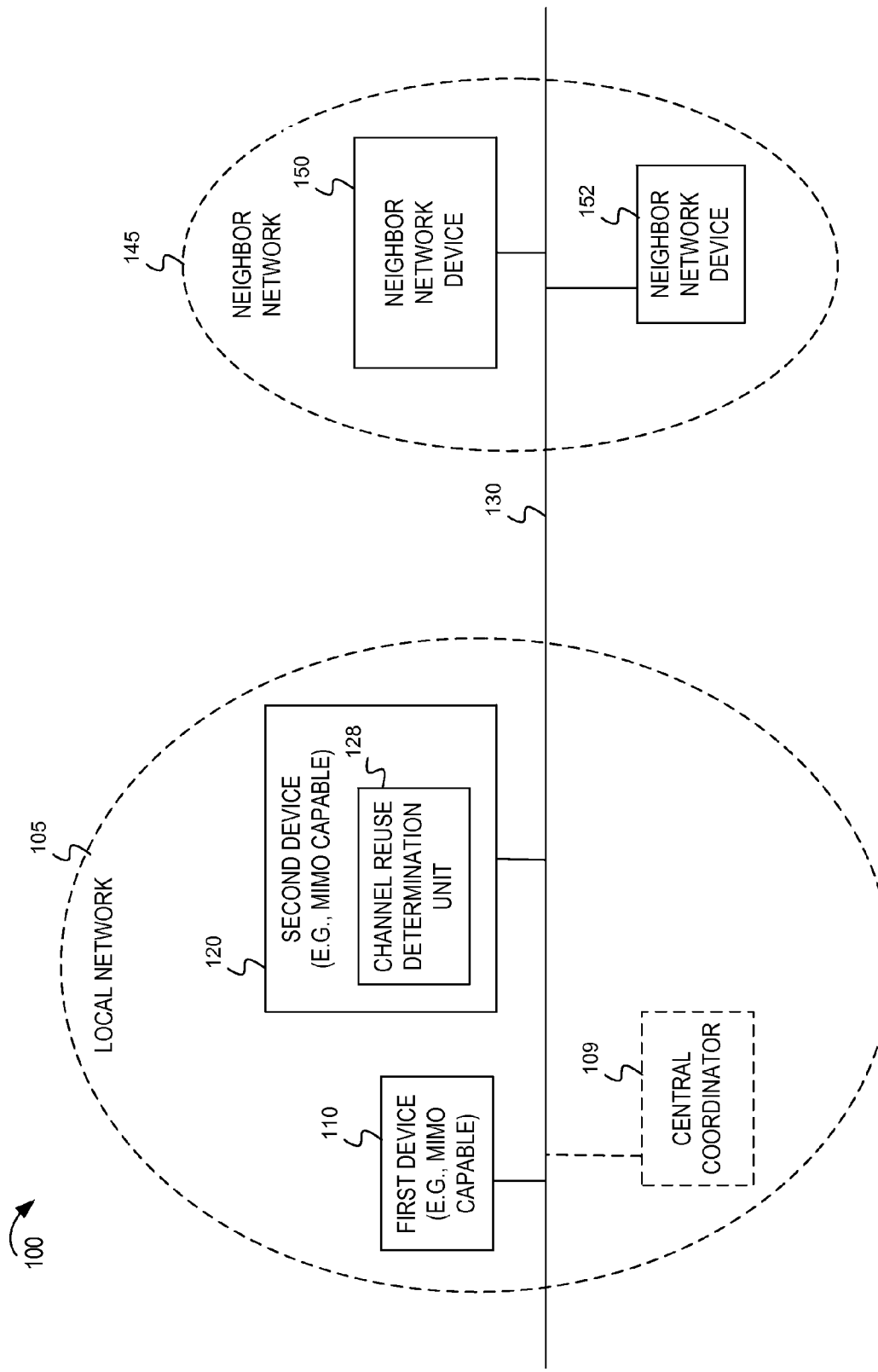
FIG. 1 depicts an example system to introduce concepts of this disclosure.

The description that follows includes exemplary systems, methods, techniques, instruction sequences and computer program products that embody techniques of the present disclosure. However, the described embodiments may be practiced without these specific details. For instance, although examples refer to channel reuse operations in a powerline communication (PLC) network, embodiments are not so limited. In other embodiments, the channel reuse operations can be implemented by network devices in other suitable shared-medium communication networks, such as wireless local area networks (WLAN), coax networks, phone line local area networks, etc. In some instances, well-known instruction instances, protocols, structures and techniques have not been shown in detail in order not to obfuscate the description.

A communication network, such as a PLC network, may use carrier sense multiple access (CSMA) techniques to minimize interference between network devices sharing a communication medium. Furthermore, a shared communication medium may also host multiple communication networks. For example, multiple PLC networks may operate on a shared powerline (also referred to as PLC medium). As part of determining whether to perform channel reuse with a neighbor communication network, a local communication network (e.g., the network devices in the local communication network) may determine whether reusing the channel will result in performance loss for some or all of the network devices in the local and/or neighbor communication networks.

Additional nodes or intelligent devices (e.g., coupling capacitors, switching or relay devices, etc.) within the PLC network or in communication with the PLC network may also be configured to determine whether channel reuse is affecting the communications performance (e.g., loss, errors, destructive interference, etc.). The PLC network may also represent a broadband, long haul, or regional network utilized for powerline communications. Determinations regarding interference may be performed by a transmitting device, receiving device, and/or intermediary device within or external to the PLC network.

In channel reuse, multiple devices may simultaneously transmit on a communications medium so long as their transmissions do not interfere with each other. For example, if a first PLC network and a second PLC network are capable of transmitting simultaneously on the same PLC medium without interfering with each other, the first PLC network and the second PLC network may use the same PLC medium concurrently. This is referred to as neighbor network channel reuse. As an alternative to channel reuse, channel sharing is defined as a technique where the devices use the communication medium one-at-a-time so that transmissions do not overlap. In another embodiment, interference thresholds may be utilized to determine whether distinct transmissions are interfering with one another such that channel reuse should not be implemented. For example, if the interference exceeds a first threshold represented by errors and/or signal degradation, the channel reuse may not be performed, or may be ended, in response to the interference.

In some embodiments, network devices that support and implement MIMO technology may transmit data using various propagation paths via the communication channel. In a wire-line MIMO system, multiple physical channels may be defined using conductors of a communication medium. For example, a PLC medium may have three conductors (e.g., line/hot wire, neutral wire, and ground or protected earth wire) bundled together in a sheath. A wire pair consisting of two conductors may be used together to define a physical channel. To implement MIMO for PLC, two of the conductors may be used to carry signals while a third conductor may serve as a reference for both of the two signal-carrying conductors. As such, it is possible to have at least two physical channels in MIMO for PLC. Additionally, signal processing may be used to implement beamforming technologies which take advantage of crosstalk in the communication medium.

In one embodiment, a local network may determine whether channel reuse is possible while taking advantage of MIMO enhancements. Channel reuse may be further improved by determining signal performance metrics associated with the different MIMO transmission modes. A transmission mode may be selected to facilitate channel reuse of the PLC medium by the local network and neighbor network. For example, a first device and a second device may belong to a local network that shares the PLC medium with a neighbor network. The transmission mode may be selected based, at least in part, on signal measurements and interference measurements at two or more receivers of the second device (e.g., receiving device). The transmission mode may be selected from a group comprising a 2-stream MIMO eigen-beamforming transmission mode, a 1-stream MIMO spot beamforming transmission mode, and a 1-stream SISO transmission mode.

FIG. 1 depicts an example system 100 to introduce concepts of this disclosure. The example system 100 includes a local network 105 with devices coupled to a PLC medium 130. The local network 105 includes a first device 110 and a second device 120. In some implementations, the local network 105 may also include a central coordinator 109. Also coupled to the PLC medium 130 are other devices that form a neighbor network 145, including neighbor network devices 150, 152.

As an example of channel reuse, consider the example system 100. A determination may be made whether local network 105 and the neighbor network 145 may utilize channel reuse. If the local network 105 can concurrently transmit and receive when the neighbor network 145 is transmitting, and vice versa, then both the local network 105 and the neighbor network 145 may implement channel reuse. As an example, if the first device 110 has a transmission to send to the second device 120, the second device 120 may determine if the transmission can be received without exceeding an interference threshold associated with the neighbor network 145. Interference may refer to communications on the PLC medium 130 that are associated with the neighbor network 145 (e.g., negatively affect communications on the local network 105). For example, an interfering communication between neighbor network device 150 and neighbor network device 152 may cause interference at the second device 120, depending on, for example, distance and attenuation characteristics of the PLC medium 130.

In this disclosure, interference (or inter-network interference) refers to communications from one or more nearby networks, such as the neighbor network 145, and may be different from a noise metric. For example, noise may be defined as electrical noise associated with the PLC medium 130. Typically, a receiving device, such as second device 120 may determine a signal-to-interference-and-noise (SINR) value to quantify the signal quality compared to noise and interference. If the SINR is high enough, then the second device 120 may receive the transmission from the first device 110 even if the neighbor network 145 is causing inter-network interference to the second device 120.

The second device 120 may include a channel reuse determination unit 128 that determines signal measurements and interference measurements to calculate the SINR for a transmission. The second device 120 may determine whether the channel can be reused based at least in part on the SINR. In some embodiments, the channel reuse determination unit 128 may communicate a message to the first device 110 to indicate that channel reuse can be used. Alternatively, the channel reuse determination unit 128 may communicate signal measurements and interference measurements to the first device 110, such that the first device 110 can make a channel reuse determination. As another alternative, the channel reuse determination unit 128 may communicate a channel reuse suggestion or the signal measurements and interference measurements to the central coordinator 109. The central coordinator 109 may make a channel reuse determination and send corresponding instructions to the first device 110 and second device 120.

In another embodiment, the central coordinator 109 may represent a device or unit outside the local network 105 configured to determine that channel reuse is acceptable or unacceptable based on the detected signals and conditions of both the local network 105 and the neighbor network 145. For example, the central coordinator 109 may be integrated with either the local network 105 or the neighbor network 145. In another example, the central coordinator 109 may be independent of both the local network 105 and the neighbor network 145.

In MIMO capable devices, a device may have more than one transmitter and/or more than one receiver. For example, the second device 120 may have two receivers (not shown) which can independently receive signals, noise, and interference. Therefore, the second device 120 may determine SINR associated with each receiver. In one embodiment, the transmitters or receivers of the first device 110 and the second device 120 may be referred to as transmitter ports (or TX ports) or receiver ports (or RX ports) of the devices. Depending on which receiver has the strongest SINR, the second device 120 may direct the first device 110 to transmit a signal directed at only one of the receivers using a SISO transmission mode. Alternatively, the second device 120 may direct the first device 110 to utilize a MIMO transmission mode using either 1-stream spot beamforming or 2-stream Eigen beamforming. The SISO and MIMO transmission modes are further described in FIGS. 3A-3C below.

In accordance with this disclosure, the channel reuse determination unit 128 may determine a transmission mode (e.g., 2-stream MIMO Eigen beamforming, 1-stream MIMO spot beamforming, or 1-stream SISO) that facilitates channel reuse. For example, if interference from the neighbor network 145 prevents a high speed MIMO transmission (e.g., using 2-stream MIMO Eigen beamforming) from having a high enough SINR to allow for successful decoding, the 1-stream MIMO spot-beamforming or the SISO transmission mode may provide a higher SINR that allows for successful decoding.

To select a transmission mode facilitating channel reuse, the second device 120 may determine interference measurements and signal measurements associated with multiple receivers of the second device. Various calculations may be performed using the interference measurements and signal measurements to determine which transmission mode to select. For example, a first path signal performance metric may be determined based at least in part on the interference measurements and the signal measurements associated with a first receiver of the second device 120, and a second path signal performance metric may be determined based at least in part on the interference measurements and the signal measurements associated with a second receiver of the second device 120. The channel reuse determination unit 128 may use the first path signal performance metric and the second path signal performance metric to select the transmission mode. Alternatively, the interference measurements and the signal measurements may be used to determine a combined signal performance metric associated with each transmission mode.

Receiver performance can be measured using an Automatic Gain Control (AGC) value, an average or per-carrier signal amplitude, an average or per-carrier signal-to-noise ratio (SNR), other metrics, or any combination thereof. Similarly, the interference level can be measured using AGC value, the overall or per-carrier signal amplitude, other metrics or any combination thereof. Receiver performance can be different under different MIMO transmission modes. If the second device 120 uses one receiver the second device 120 may generate measurement samples from the receiver and process the measurement samples to determine receiver performance for the 1-stream SISO or 1-stream MIMO spot-beamforming transmission mode. Alternatively, if the second device 120 uses two receivers, it may generate two measurement samples from its two receivers and process the measurement samples to determine receiver performance for the 2-stream MIMO Eigen beamforming transmission mode.

The second device 120 may have two signal measurement results (S) from the two receivers, which may be denoted by S(LN) and S(LG) (e.g., Line-Neutral, referred to as "LN", and Line-Ground, referred to as "LG"), respectively. Having obtained two signal measurement results, the second device 120 may have a few options to estimate its receive performance according to S(LN) and S(LG). In one implementation, the second device 120 may utilize one of the measurements (e.g., S(LN) or S(LG)) to estimate the receive performance. In another implementation, the second device 120 may use various ways of combining the two signal level measurements. In one implementation, the second device 120 may take the larger value (maximum) of S(LN) and S(LG) to estimate the performance based on the receiver with better channel quality. In another implementation, the second device 120 may take the smaller value (minimum) of S(LN) and S(LG) to estimate the performance based on the receiver with poorer channel quality. In yet another implementation, the second device 120 may take the average of S(LN) and S(LG) to estimate the performance based on the average channel quality. In another implementation, the second device 120 may perform other or additional calculations of S(LN) and S(LG) to reflect the performance gain. In addition to independent signal level measurements, the device can calculate the overall combined signal level measurement. For example, the second device 120 may do equal gain combining of the signals from the two receivers. In another example, the second device 120 may use the maximal ratio combining (MRC) technique. The second device 120 may make use of the estimated channel coefficients for the two receivers to calculate the final signal quality level using MRC method.

Similar to the various calculations for the signal measurements, the interference measurements may be used in different ways to determine receiver performance. With the measured receive performance derived from S(LG)/S(LN) and the interference derived from I(LG) and I(LN), the second device 120 may estimate the SINR for different transmission modes to determine how the local network 105 and the neighbor network 145 may reuse the channel.

While FIG. 1 describes that the second device 120 makes the selection of transmission mode to facilitate the channel reuse, in other embodiments, the channel reuse determination may be performed by the first device 110 or the central coordinator 109.

Figure 2:
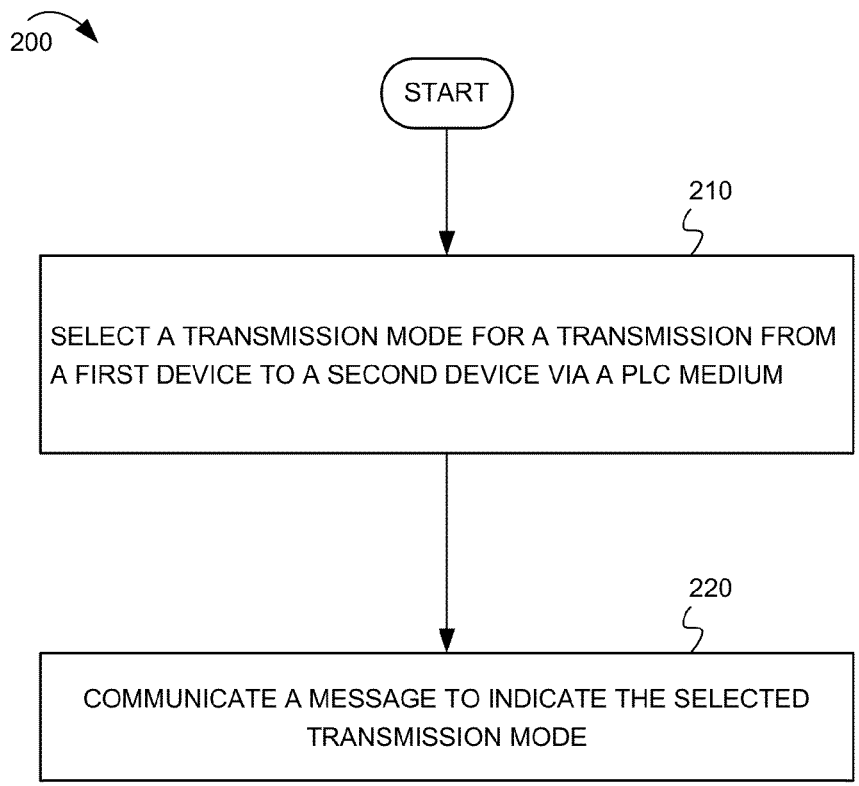
FIG. 2 depicts a flow diagram in which a transmission mode is selected in accordance with an embodiment of this disclosure.

FIG. 2 depicts a flow diagram 200 in which a transmission mode is selected in accordance with an embodiment of this disclosure. At block 210, a device may select a transmission mode. In one embodiment, the transmission mode is utilized for a transmission from a first device to a second device via a PLC medium. The first device and second device belong to a local network that shares the PLC medium with a neighbor network. The transmission mode is selected to facilitate channel reuse of the PLC medium by the local network and neighbor network. The transmission mode is selected from a group comprising a 2-stream multiple-input-multiple-output (MIMO) eigen-beamforming transmission mode, a 1-stream MIMO spot beamforming transmission mode, and a 1-stream single-input-single-output (SISO) transmission mode.

At block 220, the device may communicate a message to indicate the selected transmission mode. For example, if the second device made the selection of the transmission mode, the second device may communicate the message to the first device. If the first device made the selection of the transmission mode, the first device may communicate the message to the second device. In other embodiments, a central coordinator may be part of the local network. The central coordinator may make the selection of the transmission mode and then communicate a message to both the first and second devices.

FIGS. 3A-3C depict various transmission modes which may be selected in accordance with embodiments of this disclosure. In the examples of FIGS. 3A-3C, the PLC medium may include two channels (as previously noted Line-Neutral, referred to as "LN", and Line-Ground, referred to as "LG"). While LN and LG are used in this description as examples, other wire pairs may be used in other implementations. In the examples of FIG. 3A-3C, the MIMO capable devices may use both Line-Neutral and Line-Ground coupling for transmitting signals out of the two transmitters (TX1 and TX2). Due to the cross-coupling between LN and LG, there are four possible signal propagation paths from the two transmitters to the two receivers (RX1 and RX2).

In other examples (not depicted), a receiving device (such as second device 320) could utilize more than two receivers. For example, a third wire pair (e.g., Neutral-Ground, referred to as "NG") could be defined. A receiver may utilize a third receiver (RX3, not shown) to measure signals associated with the third wire pair (NG). Although a transmitter may inject two transmitted signals (via TX1 and TX2), there may be six propagation paths defined from transmitters TX1 and TX2 to receivers RX1, RX2, and RX3. In the interest of clarity, the foregoing descriptions will describe the second device 320 having two receivers, but the embodiments are not limited to such.

In FIG. 3A, a SISO transmission mode 300 is depicted. A first device 310 has a first transmitter 312 (TX1) and may have a second transmitter 314 (TX2). The first transmitter 312 transmits data via the first propagation path 332 (Line-Neutral wire pair) to a first receiver 322 of a second device 320. The second device 320 may also have a second receiver 324. In some embodiments, the second device 320 may also utilize the second receiver 324 to receive signals. However, in the example of FIG. 3A, the SISO transmission mode is primarily between the first transmitter 312 and the first receiver 322. A single stream of data is transmitted via the first propagation path 332.

In FIG. 3B, the 1-stream MIMO spot beamforming transmission mode 301 is described. In MIMO spot beamforming, the first device 310 may take advantage of crosstalk from the Line-Ground wire pair to add energy to the Line-Neutral wire pair. The crosstalk is illustrated in FIG. 3B as another propagation path 338. The first device 310 may transmit the same data via the LN and LG channels to improve reception at the first receiver 322 of the second device 320. By sending the same single stream packet using the two transmitters together with beamforming, communications performance (e.g. throughput, reliability, etc.) can be improved. This mode may also be useful when a MIMO device has two transmitters but it is communicating with a SISO PLC device having one receiver.

In FIG. 3C, the 2-stream MIMO Eigen beamforming transmission mode 302 is described. The first device 310 may transmit two different data streams: one data stream on the Line-Neutral channel and one stream on the Line-Ground channel. The first device 310 may perform signal processing to utilize the first propagation path 332 (LN), the second propagation path 334 (LG), a third propagation path 336 (LN-to-LG crosstalk), and a fourth propagation path 338 (LG-to-LN crosstalk) to convey the two data streams. Typically, the 2-stream beamforming is performed utilizing a mathematical calculation involving beamforming coefficients at the transmitting device and the receiving device to properly transmit (on the transmit side) different combinations of the two streams of data so that the receiver (on the receiver side) can distinguish the two streams as is further described below.

FIGS. 4A-4C depict various example physical layer (PHY) protocol data unit (PPDU) formats associated with the transmission modes of corresponding FIGS. 3A-3C. The examples in FIGS. 4A-4C are based, in part, on the draft specification entitled "HomePlug AV Draft Specification, Version 2" of the HomePlug Power Alliance™. The example PPDUs include a combination of HomePlug version 1 frame control symbols (referred to as "HP1.0 FC") as well as HomePlug version 2 frame control symbols (referred to as "AV2 FC" or the like).

In FIG. 4A, the PPDU format 410 may be used in the SISO transmission mode. This SISO PPDU format contains one stream that is transmitted from one transmitter as depicted in FIG. 3A. The first PPDU 410 includes a preamble 411, a HP1.0 frame control symbol 412, an AV2 frame control symbol 413, and data symbols 414, 415, 416. No beamforming is used with the first PPDU 410.

In FIG. 4B, a second PPDU format 420 is used in the 1-stream MIMO spot beamforming transmission mode. In the 1-stream MIMO spot beamforming transmission mode, all parts of the packet, including the preambles 421A, 421B, HP1.0 frame control symbols 422A, 422B, AV2 frame control symbols 423A, 423B, and data symbols 424A, 425A, 426A, 424B, 425B, 426B are beamformed. The waveform transmitted by TX1 and TX2 are both based, at least in part, on the same packet stream data. 1-stream MIMO spot beamforming transmissions may include two or more waveforms obtained by applying a set of beamforming coefficients to the same packet stream data. Hence, the waveforms may or may not be identical even though they may carry the same information. In one example, the same waveform may be transmitted from the two transmitters. In another example, different waveforms (processed from the same packet data stream) are generated and sent via the two transmitters.

In FIG. 4C, the third PPDU format 430 is used for the 2-stream MIMO Eigen beamforming transmission mode. The third PPDU format 430 includes preambles 431, HP1.0 frame control symbols 432, and an orthogonal pair of the AV2 FC symbols (AV2-FC$_1$ to AV2-FC$_4$) 433-436 that facilitates estimation of the full MIMO channel (all four MIMO propagation paths). Note that the data symbols 437A, 437B, 438A, 438B are beamformed in this mode. Different from the 1-stream MIMO spot beamforming mode, in 2-stream MIMO Eigen beamforming mode the device may need to consider taking multiple measurements to process the information depending on specific PPDU symbols. This is mainly because in 2-stream MIMO mode, the delimiter (preambles 431 and frame control symbols 432) and payload symbols are transmitted differently. The delimiter symbols are transmitted without transmit beamforming, while payload symbols are beamformed to the intended receiver (RX1 or RX2). This difference may cause different measurement results.

The receiver may also have the beamforming information that it can use together with signal measurements from the delimiter. In one embodiment, the receiving device may take measurements from payload symbols. Alternatively, the receiving device may take measurements from delimiter symbols and apply correction factor(s) to the measurement results according to the measurement correlation between delimiter symbols and payload symbols and beamforming coefficients.

Alternatively, the receiving device may take measurements from both delimiter symbols and payload symbols, and then combine the measurement results. The receiving device can use the full MIMO channel (all four propagation paths) estimated from the delimiter symbols and combine it with the beamforming coefficients to find the receive signal quality (or other performance) metrics.

Figure 5:
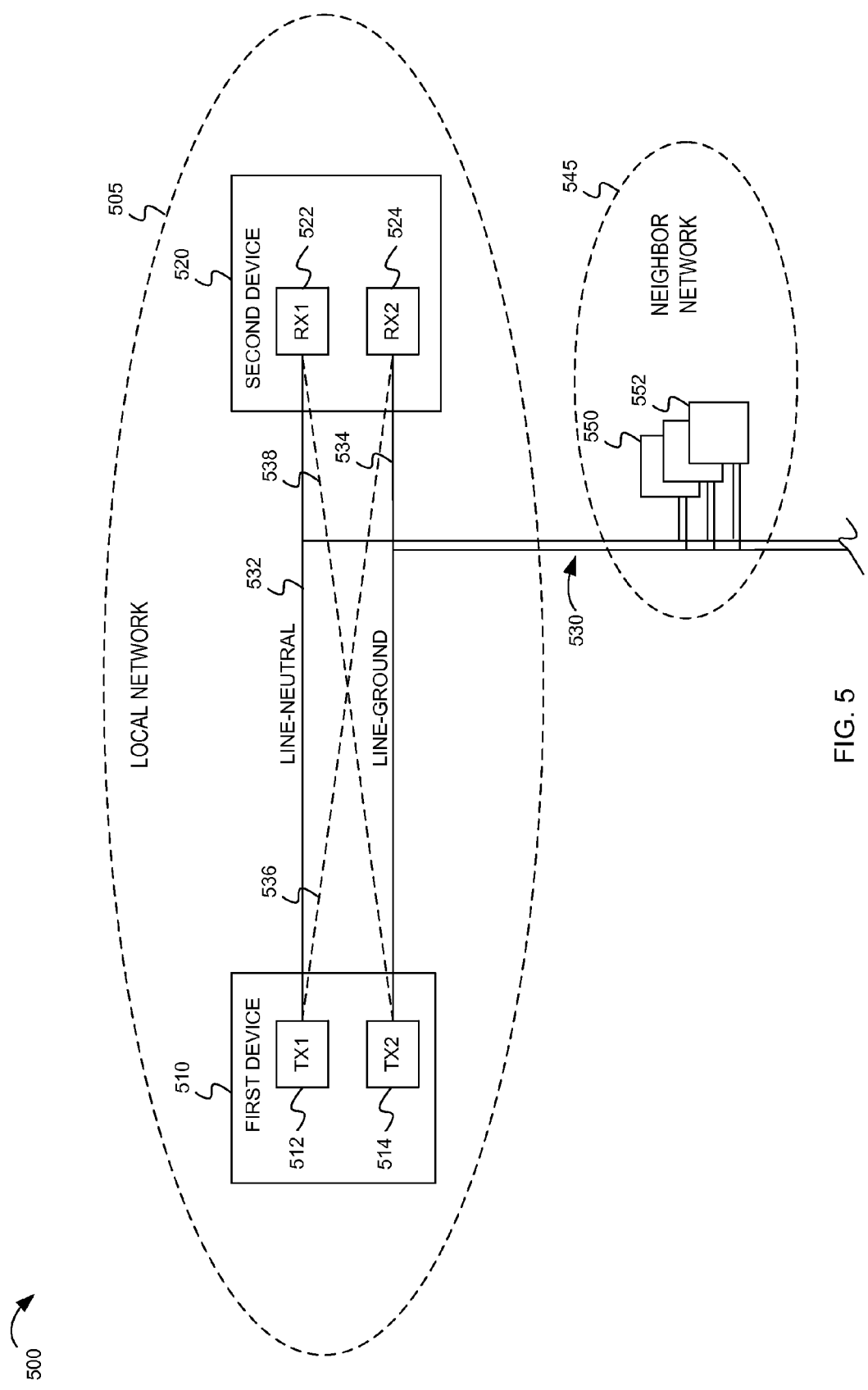
FIG. 5 depicts an example system in which a transmission mode is selected in accordance with an embodiment of this disclosure.

FIG. 5 depicts an example system 500 in which a transmission mode is selected in accordance with an embodiment of this disclosure. FIG. 5 depicts items that are previously described in FIGS. 1 and 3. In FIG. 5, the local network 505 includes a first device 510 and a second device 520 that are coupled to a PLC medium 530. The PLC medium 530 may include two channels (e.g., Line-Neutral and Line-Ground). The first device 510 includes two transmitters, a first transmitter 512 (TX1) and a second transmitter 514 (TX2). The second device 520 includes two receivers, a first receiver 522 (RX1) and a second receiver 524 (RX2). Between the TX1, TX2, RX1, and RX2, there may be defined four propagation paths over the two channels. The propagation paths are defined as a first propagation path 532, a second propagation path 534, a third propagation path 536, and a fourth propagation path 538.

FIG. 5 also shows that a neighbor network 545 is coupled to the PLC medium 530. The neighbor network 545 includes neighbor network devices 550, 552 that communicate with each other. The transmissions between neighbor network devices 550, 552 may cause interference at the second device 520. The second device 520 may measure the interference level from neighbor network 545 using different measurement techniques depending on the transmission mode. If the device uses one receiver (e.g., either first receiver 522 or second receiver 524), the second device 520 may measure the neighbor network interference in a similar way as a traditional SISO device. The measurement samples will be taken from the receiver and processed to get the interference measurement result.

If the second device 520 uses two receivers (e.g., both first receiver 522 and second receiver 524), it may use different approaches to measure the neighbor network interference. Specifically, for the same signal from neighbor network 545, the second device 520 may have two measurement samples from its two receivers 522, 524, respectively. As a result, the second device 520 may have two interference measurement results from the two receivers 522, 524, which are denoted by I(LN) and I(LG) respectively. The second device 520 may have a few options to estimate neighbor network interference according to I(LN) and I(LG). In one implementation, the second device 520 may take I(LN) to estimate the interference. In another implementation, the second device 520 may take I(LG) to estimate the interference. In another implementation, the second device 520 may take the maximum of I(LN) and I(LG) to estimate the interference based on the receiver 522, 524 that measured a stronger interference level. In another implementation, the second device 520 can take the minimum of I(LN) and I(LG) to estimate the interference based on the receiver 522, 524 that measured a weaker interference level. In yet another implementation, the second device 520 may take the average of I(LN) and I(LG) to estimate the interference based on the average interference level.

With the measured receive performance derived from S(LG)/S(LN) and the interference derived from I(LG) and I(LN), the second device 520 may estimate the SINR to determine if the local network 505 and the neighbor network 545 can reuse the channel. The second device 520 may estimate different SINR under different MIMO transmission modes. In one example, the second device 520 estimates the SINR that would result from the second device 520 using only one receiver to receive SISO or 1-stream MIMO data transmission. If the first device 510 uses two transmitters for 1-stream MIMO data transmissions, the second device 520 may take that into account and calibrate the SINR estimation by including the corresponding performance gain that would result from using the 1-stream MIMO spot beamforming transmission mode. In some implementations, the second device 520 may estimate different SINRs responsive to different quantities of transmitters used by the first device 510. When the first device 510 uses two transmitters, the device may also calculate different SINR estimates for 1-stream MIMO and 2-stream MIMO respectively. The SINR estimation may also consider the signal processing method used by the second device 520 when it uses two receivers and the gain (if there is any) may be included to make an accurate estimation.

Several example calculations will be described below, using the following signal measurements, interference measurements and noise levels at the receivers 522, 524 (RX1, RX2):

Signal level at LN of the receiver: S(LN)
Signal level at LG of the receiver: S(LG)
Interference level at LN of the receiver: I(LN)
Interference level at LG of the receiver: I(LG)
Noise level at LN of the receiver: N(LN)
Noise level at LG of the receiver: N(LG)

Noise levels may depend on the RX side. In addition, the noise levels may be independent of the transmission mode employed at the in-network transmitter and the interfering transmitter. Signal and interference levels at the receivers may depend on the transmission mode employed at the in-network transmitter and the interfering transmitter.

In 1-stream transmissions from the in-network transmitter (note this could be a SISO transmission or a 1-stream Spot beamforming transmission), a first path signal performance metric may be calculated. In the example below, the first path signal performance metric is the SINR for the LN receiver, calculated as:

$$\text{SINR}(LN) = S(LN)/(I(LN) + N(LN)) \qquad \text{eq}(1)$$

For example, if the second device 520 has two receivers 522, 524, this calculation can be done on the second receiver 524 as well, to determine a second path signal performance metric:

$$\text{SINR}(LG) = S(LG)/(I(LG) + N(LG)) \qquad \text{eq}(2)$$

The second device 520 may use these SINR levels and compare them to a predetermined threshold to determine which receiver 522, 524 has the higher SINR. For example, SINR(LN) may be too low, but SINR(LG) could be high enough to allow for channel reuse.

Other ways of calculating the SINR may be used to generate a combined signal performance. For example, one alternative is to use equal gain combining (EGC). A coarse estimate of SINR in EGC case can be:

$$\text{SINR}(EGC) = (S(LN) + S(LG))/(I(LN) + N(LN) + I(LG) + N(LG)) \qquad \text{eq}(3)$$

Another way could be taking the average as:

$$\text{SINR}(EGC1) = (\text{SINR}(LN) + \text{SINR}(LG))/2 \qquad \text{eq}(4)$$

Alternatively, if the channel frequency response coefficients are known for all carriers of an OFDM system, the combined signal performance metric may be based on a maximal ratio combining (MRC) calculation. For example, the second device 520 can combine the signals at its receivers RX1 and RX2 making use of the channel coefficients.

For one carrier, assume channel from 1-stream TX to LN RX (H1) and 1-stream TX to LG RX (H2). SINR with MRC for a particular carrier c can then be $$SINR_c(MRC) = (|H1|*|H1|+|H2|*|H2|))*(TX\text{-signal-power})/(N(LN)+N(LG)+I(LN)+I(LG)) \quad eq(5)$$

The per-carrier SINR levels can then be combined to find a combined signal performance metric for the receiver. For example, the combination could be a weighted average, a maximum, a sum over certain carriers that have acceptable performance metrics, etc. The combined signal performance metric could be compared to a predetermined threshold to determine if the 1-stream spot beamforming transmission mode can be used for channel reuse.

The second device 520 may also determine signal performance metrics related to 2-stream MIMO Eigen beamforming transmission mode. SINR levels at both receivers 522, 524 may be used to determine if both the RX1 and RX2 signal qualities are high enough for the second device 520 to decode the 2 MIMO streams. In another embodiment, the SINRs for the two streams may be determined rather than the SINRs at the LN and LG receivers 522, 524.

In one embodiment, the second device 520 may determine the two SINR levels at the receivers 522, 524 and use them as coarse estimates of the SINRs for the two MIMO streams.

$$SINR(LN) = S(LN)/(I(LN)+N(LN)) \quad eq(6)$$

$$SINR(LG) = S(LG)/(I(LG)+N(LG)) \quad eq(7)$$

The second device 520 may use the SINR(LN) and SINR (LG) jointly to compare certain MIMO thresholds to determine if the local network 505 and neighbor network 545 can reuse the PLC medium 530. If 2-stream MIMO Eigen beamforming cannot be used for channel reuse, the second device 520 may determine whether to switch to 1-stream MIMO spot beamforming or SISO transmission modes based on the SINR calculations and comparisons as mentioned above.

In one embodiment, each device (e.g., first device 510 and second device 520) of the local network 505 may make its channel reuse decision and report the decision to a central coordinator (not shown) which will make the coordinated channel reuse decision. Alternatively, the second device 520 may send statistics information used for SINR estimation to the central coordinator which will collect the information from all devices and make the coordinated channel reuse decision. The coordination may be performed assuming each device's transmitter/receiver configuration remains the same or assuming the device's configuration can be changed. In another embodiment, the first device 510 or the second device 520 may use a threshold associated with interference to determine whether channel reuse may be implemented. For example, if interference is below a first threshold, the first device 510 and the second device 520 may implement channel reuse. If the interference exceeds the first threshold, the channel reuse may be stopped.

With the estimated SINRs under different device configurations and data transmission modes, there may be other improvements that can be done to exploit channel reuse gain. For example, if it is found that the interference levels are significantly different across different carriers, the first device 510 and the second device 520 may consider avoiding using the certain carriers with very strong interference from the neighbor networks. Similar to exploiting the interference differences in frequency domain, if the arrival time of signals from the neighbor network, the transmitter and receiver devices may consider adapting the temporal transmission rate to the known interference arrival times.

Figure 6:
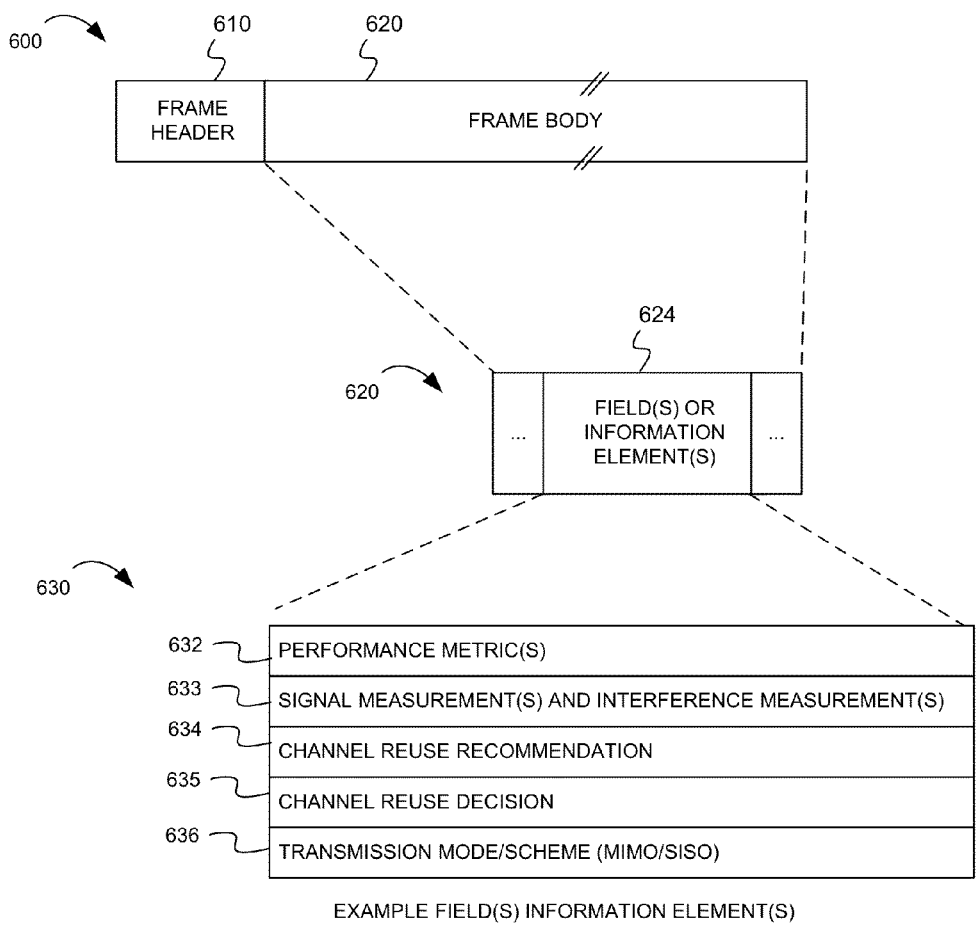
FIG. 6 depicts an example message format for communicating channel reuse or transmission mode information in accordance with an embodiment of this disclosure.

FIG. 6 depicts an example message format 600 in accordance with an embodiment of this disclosure. The example message format 600 includes a frame header 610 and frame body 620. The frame body 620 may include one or more fields or information elements 624. Depending on the type of message, the fields or information elements 624 may include different types of channel reuse information 630. Example channel reuse information 630 may include:

Performance Metric(s) 632: The message may include first path signal performance metrics, second path signal performance metrics, and/or a combined signal performance metric. For example, the performance metrics 632 may be an SINR estimate for one or more transmission modes. This information may be provided to another device, such as a central coordinator, such that the central coordinator can determine a transmission mode for channel reuse.

Signal Measurement(s) and Interference Measurement(s) 633: The message may include measurement data or metrics that describe signal levels and interference levels. This information may be provided to a central coordinator or a transmitting device to allow the recipient of the measurement data to select a transmission mode to facilitate channel reuse.

Channel Reuse Recommendation 634: A receiving device may send a channel reuse recommendation to a central coordinator or a transmitting device.

Channel Reuse Decision 635: The message may include a channel reuse decision. For example, a central coordinator may send a message with a channel reuse decision to one or more transmitting devices.

Transmission Mode/Scheme 636: The message may indicate a selected transmission mode. The transmission mode may specify MIMO or SISO, and may indicate a transmission mode (e.g., 1-stream MIMO spot beamforming or 2-stream MIMO Eigen beamforming).

The message may be a management message (MME), a channel estimation message, a tone mask message, or any suitable message for exchanging transmission mode information or channel reuse information.

Figure 7:
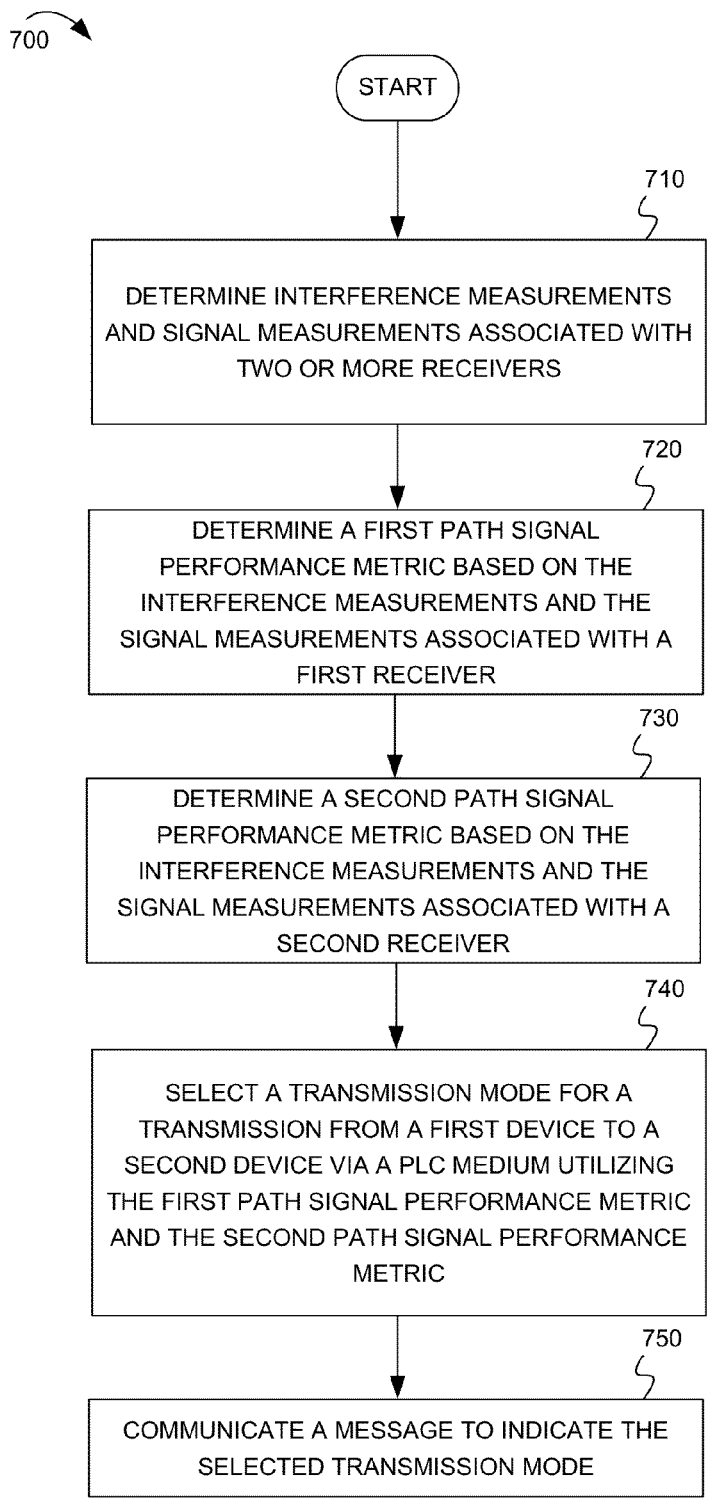
FIG. 7 depicts a flow diagram with example operations for selecting a transmission mode in accordance with an embodiment of this disclosure.

FIG. 7 depicts a flow diagram with example operations 700 for selecting a transmission mode in accordance with an embodiment of this disclosure. In one embodiment, the operations 700 may be performed by a second or receiving device in communication with a first or transmitting device.

At block 710, a device may determine interference measurements and signal measurements associated with two or more receivers.

At block 720, the device may determine a first path signal performance metric based at least in part on the interference measurements and the signal measurements associated with a first receiver.

At block 730, the device determines a second path signal performance metric based at least in part on the interference measurements and the signal measurements associated with a second receiver.

At block 740, the device may select a transmission mode for a transmission from a first device to a second device via a PLC medium utilizing the first path signal performance metric and the second path signal performance metric.

At block 750, the device may communicate a message to indicate the selected transmission mode.

Figure 8:
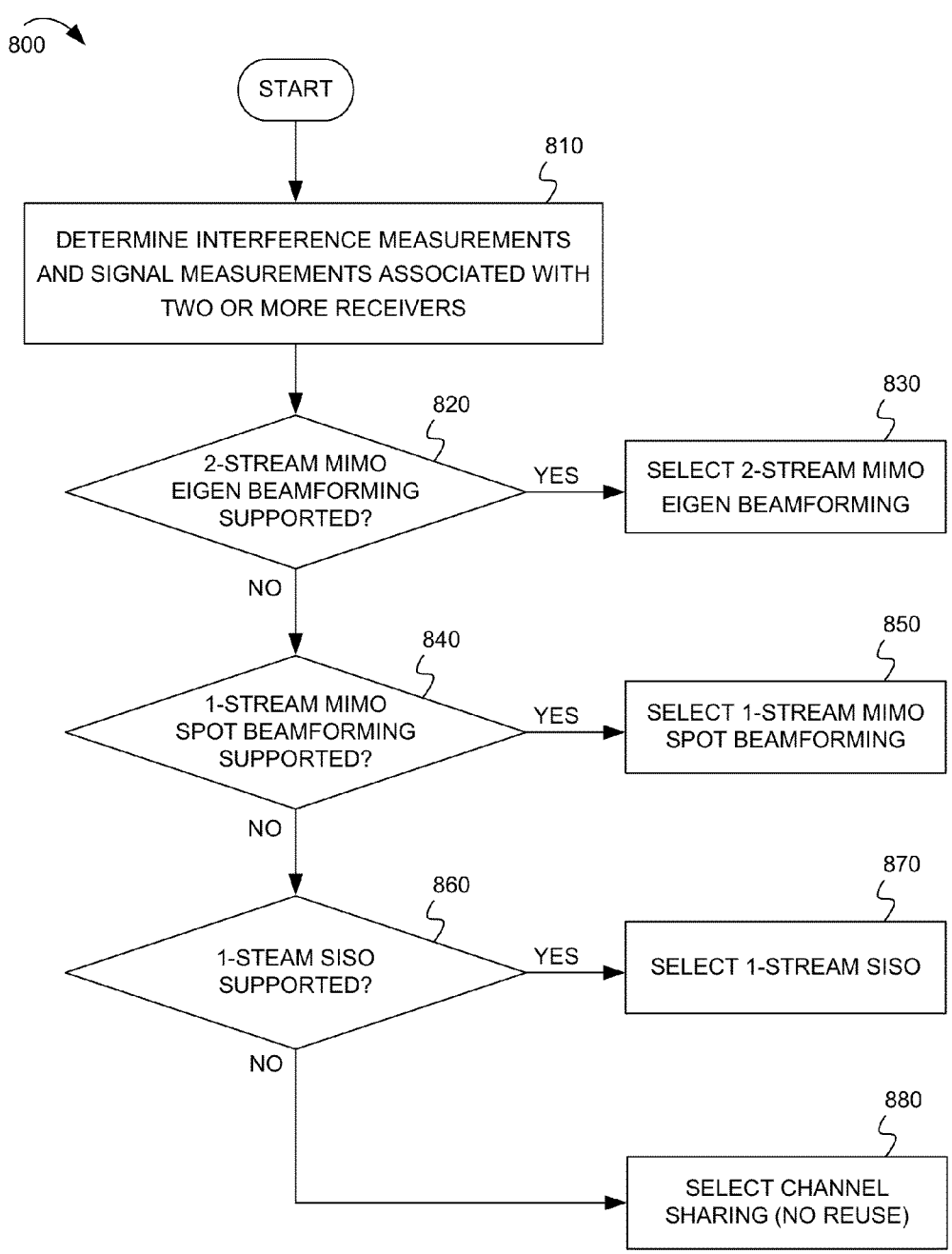
FIG. 8 depicts another flow diagram with example operations for selecting a transmission mode in accordance with an embodiment of this disclosure.

FIG. 8 depicts another flow diagram with example operations 800 for selecting a transmission mode in accordance with an embodiment of this disclosure. In some embodiments, the selection of a transmission mode may be based on a prioritization or predefined order, as shown in FIG. 8. However, any order or prioritization of transmission modes could be defined in alternative embodiments.

At block 810, a device may determine interference measurements and signal measurements associated with two or more receivers.

At decision 820, the device may determine if 2-stream MIMO Eigen beamforming transmission mode will support channel reuse. For example, the device may determine a first path signal performance metric and a second path signal performance metric. If both of the first and second path signal performance metrics (or a combined signal performance metric) are above a threshold associated with 2-stream MIMO Eigen beamforming transmission mode, then flow may proceed to block 830. If either of the first and second path signal performance metrics is below the threshold associated with 2-stream MIMO Eigen beamforming transmission mode, then flow may proceed to decision 840.

At block 830, the device may select the 2-stream MIMO Eigen Beamforming as the first option in this example.

At decision 840, the device may determine if 1-stream MIMO spot beamforming will support channel reuse. For example, this may include determining an estimated SINR if 1-stream MIMO spot beamforming is used, and then comparing the estimated SINR to a predetermined threshold associated with 1-stream MIMO spot beamforming. This decision may be satisfied if either one of the receivers could be used with 1-stream MIMO spot beamforming to facilitate channel reuse. If 1-stream MIMO spot beamforming supports channel reuse, the flow may proceed to block 850. If 1-stream MIMO spot beamforming will not support channel reuse, the flow may proceed to decision 860.

At block 850, the device may select the 1-stream MIMO spot beamforming transmission mode as the selected transmission mode. This operation may also include selecting a particular receiver.

At decision 860, the device may determine if 1-stream SISO transmission mode will support channel reuse. If supported, the flow may proceed to block 870, where the device selects the 1-stream SISO transmission mode as the selected transmission mode. If 1-stream SISO transmission mode will not support channel reuse, then flow may proceed to block 880.

At block 880, the device may determine that channel reuse may not be supported by any MIMO or SISO transmission modes. The device may select channel sharing (without channel reuse) as the last option for sharing the communication medium with the neighbor network.

Figure 9:
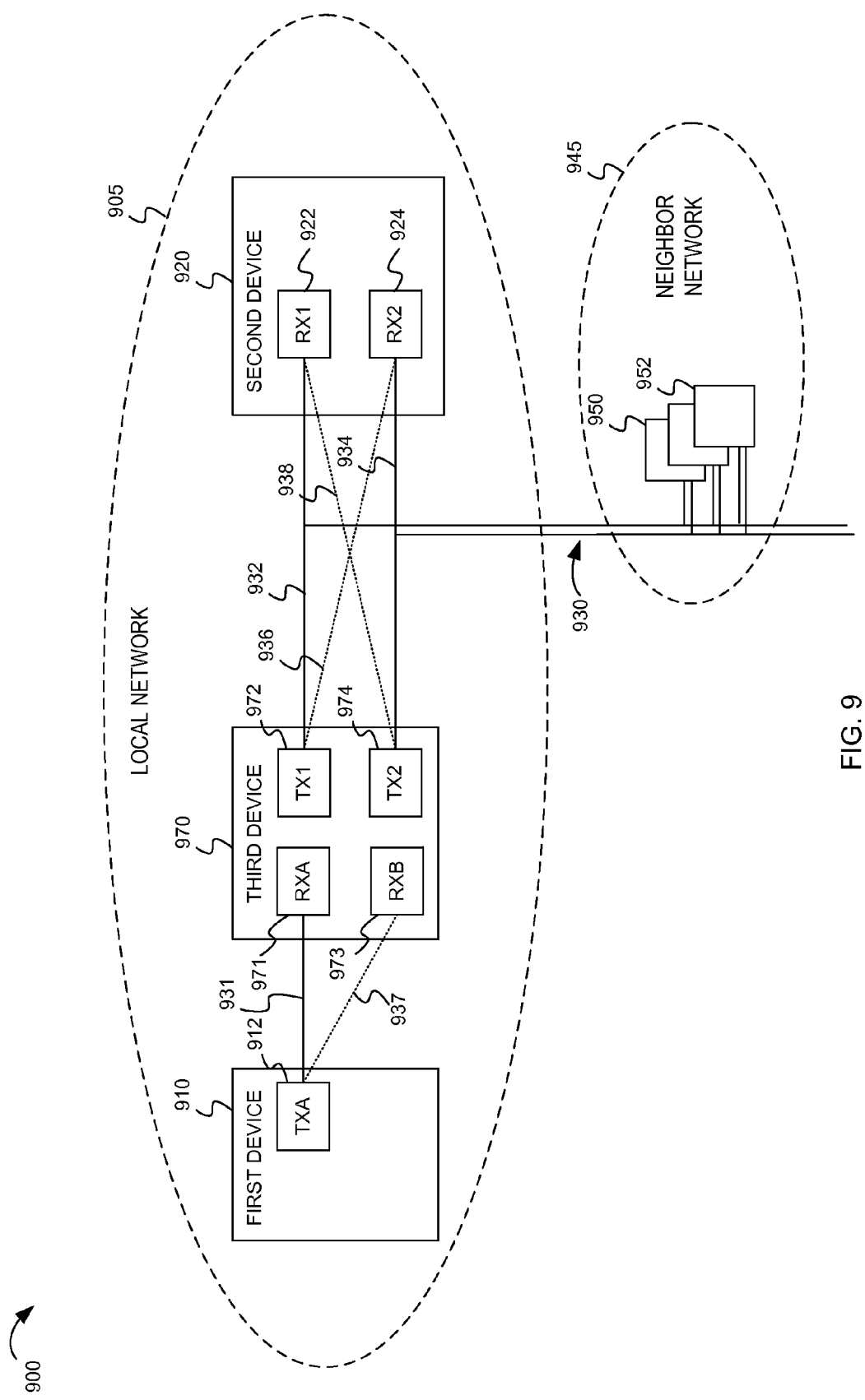
FIG. 9 depicts an example system in which a third device is used as a repeater in accordance with an embodiment of this disclosure.

FIG. 9 depicts an example system 900 in which MIMO capabilities of a third device are utilized to facilitate channel reuse in accordance with an embodiment of this disclosure. FIG. 9 depicts a local network 905 that includes a first device 910 and a second device 920 that are coupled to a PLC medium 930. FIG. 9 also depicts a third device 970 that is coupled to the PLC medium 930 and that is part of local network 905. The PLC medium 930 may include two channels (e.g., Line-Neutral and Line-Ground).

In FIG. 9, the first device 910 includes a first transmitter 912 (TXA). The first device 920 may or may not include a second transmitter (not shown). For example, the first device 910 might be a single transmitter device that does not support MIMO. Alternatively, the first device 910 may be equipped with a second transmitter that is not in operation. The second device 920 includes two receivers, a first receiver 922 (RX1) and a second receiver 924 (RX2). The third device 970 includes two receivers, a first receiver 971 (RXA) and a second receiver 973 (RXB). The third device 970 also includes two transmitters, a first transmitter 972 (TX1) and a second transmitter 974 (TX2).

FIG. 9 also shows that a neighbor network 945 is coupled to the PLC medium 930. The neighbor network 945 includes neighbor network devices 950, 952 that communicate with each other. The transmissions between neighbor network devices 950, 952 may cause interference at the second device 920.

In one example scenario, the first device 910 may have a transmission directed at second device 920. However, the first device 910 may only be capable of transmitting using the first transmitter TXA 912. Due to signal strength and the inability to perform MIMO beamforming, the transmission from the first device 910 to the second device 920 be significantly interfered by transmissions in the neighbor network 945. Therefore, channel reuse may not be possible if the first device 910 transmits using SISO transmission mode to second device 920. However, the third device 970 may be capable of channel reuse by using a MIMO transmission mode. For example, the third device 970 may use a 2-stream MIMO eigen-beamforming transmission mode or a 1-stream MIMO spot beamforming transmission mode to transmit from the third device 970 to the second device 920 without being significantly interfered by transmissions in the neighbor network 945. The third device 970 may facilitate channel reuse by relaying transmissions from the first device 910.

The network can be configured such that a transmission from the first device 910 may be sent to the third device 970 without being significantly interfered by transmissions in the neighbor network 945. The third device 970 may then utilize a MIMO transmission mode to relay the transmission to the second device 920. In one embodiment, the third device 970 may still utilize the first receiver RXA 971 and the second receiver RXB 973 to receive the transmission from the first device 910. The transmission from first device 910 may traverse a first propagation path 931 and a second propagation path 937 to the third device 970.

From the third device 970 to the second device 920, there may be four propagation paths between the transmitters TX1, TX2, and receivers RX1, and RX2, over the two channels. The propagation paths are a first propagation path 932, a second propagation path 934, a third propagation path 936, and a fourth propagation path 938. Similar to FIG. 5, the third device 970 may determine a transmission mode that will allow for channel reuse with a neighbor network 945. The third device 970 may utilize a MIMO transmission mode that is not interfered with the transmissions of the neighbor network 945, thus facilitating the channel reuse. Even though the transmission from first device 910 may have been transmitted using SISO transmission mode, the third device 970 may utilize two receivers to improve the receiving performance for transmissions from the first device 910.

FIGS. 1-9 and the operations described herein are examples meant to aid in understanding various embodiments and should not limit the scope of the claims. Embodiments may perform additional operations, fewer operations, operations in parallel or in a different order, and some operations differently.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "unit" or "system." Furthermore, aspects of the present disclosure may take the form of a computer program product embodied in one or more computer readable medium(s) having computer readable program code embodied thereon.

Any combination of one or more computer readable medium(s) may be utilized, with the sole exception being a transitory, propagating signal. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
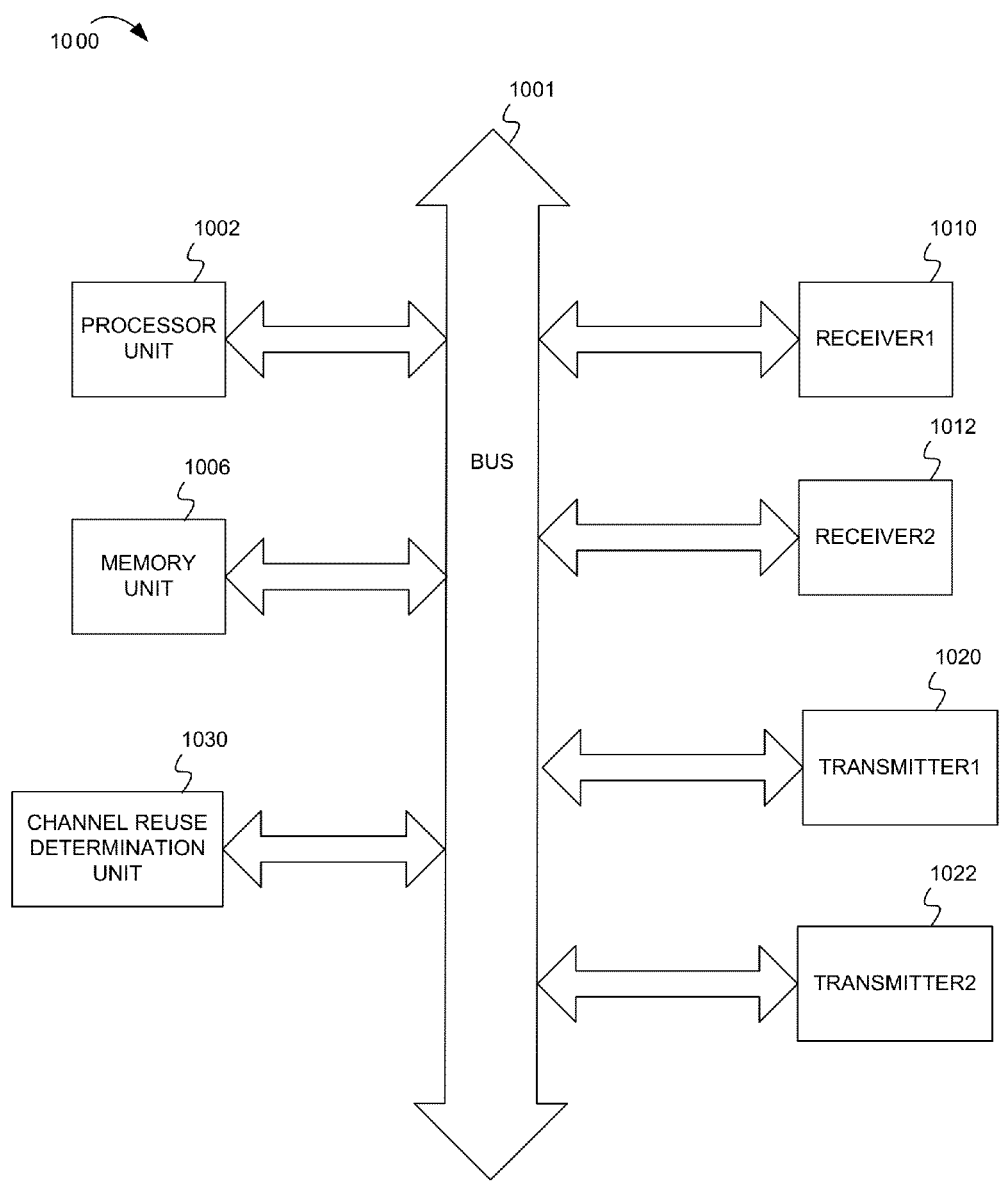
FIG. 10 depicts an electronic device capable of implementing various embodiments of this disclosure.

FIG. 10 is an example block diagram of one embodiment of an electronic device 1000 capable of implementing various embodiments of this disclosure. In some implementations, the electronic device 1000 may be an electronic device such as a laptop computer, a tablet computer, a mobile phone, a powerline communication device, a gaming console, or other electronic systems. In some implementations, the electronic device may comprise functionality to communicate across multiple communication networks (which form a hybrid communication network). The electronic device 1000 includes a processor unit 1002 (possibly including multiple processors, multiple cores, multiple nodes, and/or implementing multi-threading, etc.). The electronic device 1000 includes a memory unit 1006. The memory unit 1006 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1000 also includes a bus 1001 (e.g., PCI, ISA, PCI-Express, HyperTransport®, InfiniBand®, NuBus, AHB, AXI, etc.). The electronic one or more network interfaces that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.). The electronic device 1000 may include a first transmitter 1020 and a second transmitter 1022. The electronic device may include a first receiver 1010 and a second receiver 1012. Together the transmitters 1020, 1022 and receivers 1010, 1012 may comprise a network interface. The electronic device 1000 may include channel reuse determination unit 1030 configured to implement various embodiments described in the forgoing figures.

Any one of these functionalities may be partially (or entirely) implemented in hardware and/or on the processor unit 1002. For example, the functionality may be implemented with an application specific integrated circuit, in logic implemented in the processor unit 1002, in a co-processor on a peripheral device or card, etc. Further, realizations may include fewer or additional components not illustrated in FIG. 11 (e.g., video cards, audio cards, additional network interfaces, peripheral devices, etc.). The processor unit 1002, the memory unit 1006, transmitters 1020, 1022, and receivers 1010, 1012 may be coupled to the bus 1001. Although illustrated as being coupled to the bus 1001, the memory unit 1006 may be directly coupled to the processor unit 1002.

While the embodiments are described with reference to various implementations and exploitations, these embodiments are illustrative and that the scope of the present disclosure is not limited to them. In general, techniques for selecting a transmission mode as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for managing communication via a powerline communication (PLC) medium, the method comprising:
    selecting a transmission mode for a transmission from a first device to a second device via the PLC medium, the first device and the second device belonging to a first PLC network that shares the PLC medium with a second PLC network,
    wherein the transmission mode is selected to facilitate concurrent use of the PLC medium by the first PLC network and the second PLC network, and
    wherein the transmission mode is selected from a group consisting of a 2-stream multiple-input-multiple-output (MIMO) eigen-beamforming transmission mode, a 1-stream MIMO spot-beamforming transmission mode, and a 1-stream single-input-single-output (SISO) transmission mode.

2. The method of claim 1, further comprising:
    determining interference associated with a plurality of receivers of the second device,
    wherein the transmission mode is selected based, at least in part, on the interference.

3. The method of claim 1, wherein said selecting the transmission mode is performed by the second device, the method further comprising:
    indicating the selected transmission mode.

4. The method of claim 3, wherein indicating the selected transmission mode comprises communicating an indication from the second device to the first device.

5. The method of claim 3, wherein indicating the selected transmission mode comprises communicating an indication from the second device to a central coordinator of the first PLC network.

6. The method of claim 3, wherein indicating the selected transmission mode comprises communicating at least one member of a group consisting of a management message (MME), a channel estimation message, and a tone mask message.

7. The method of claim 1, wherein said selecting the transmission mode is performed by the first device, the method further comprising:
    receiving, from the second device, interference measurements associated with a plurality of receivers of the second device,
    wherein the transmission mode is selected based, at least in part, on the interference measurements received from the second device.

8. The method of claim 1, wherein the transmission mode is selected based, at least in part, on interference measurements at a plurality of receivers of the second device, the method further comprising:
    determining a first path signal performance metric based, at least in part, on the interference measurements associated with a first receiver of the second device; and
    determining a second path signal performance metric based, at least in part, on the interference measurements associated with a second receiver of the second device,
    wherein the 2-stream MIMO eigen-beamforming transmission mode is selected in response to both the first path signal performance metric and the second path signal performance metric being above a first threshold associated with the 2-stream MIMO eigen-beamforming transmission mode.

9. The method of claim 8,
    wherein the 1-stream MIMO spot-beamforming transmission mode is selected in response to the first path signal performance metric or the second path signal performance metric being above a second threshold associated with the 1-stream MIMO spot-beamforming transmission mode.

10. The method of claim 9, wherein the 1-stream SISO transmission mode is selected in response to the first path signal performance metric or the second path signal performance metric being above a third threshold associated the 1-stream SISO transmission mode.

11. The method of claim 8, further comprising:
    calculating a combined signal performance estimate based, at least in part, on the first path signal performance metric and the second path signal performance metric,
    wherein the 1-stream MIMO spot-beamforming transmission mode is selected in response to the combined signal performance estimate being above a second predetermined threshold associated with the 1-stream MIMO spot-beamforming transmission mode.

12. The method of claim 11, wherein said calculating the combined signal performance estimate includes performing an equal gain combining (EGC) calculation.

13. The method of claim 11, wherein said calculating the combined signal performance estimate includes performing a maximal ration combining (MRC) calculation.

14. The method of claim 1, wherein selecting the transmission mode for the transmission from the first device to the second device comprises:
    selecting a first transmission mode between the first device and a third device belonging to the first PLC network, wherein the first transmission mode comprises a SISO transmission mode; and
    selecting a second transmission mode between the third device and the second device, wherein the second transmission mode comprises a MIMO transmission mode.

15. A first device for communicating via a powerline communication (PLC) medium, the first device comprising:
    a processor; and
    memory having instructions stored therein which, when executed by the processor, cause the first device to:
        select a transmission mode for a transmission from the first device to a second device via the PLC medium, the first device and the second device belonging to a first PLC network that shares the PLC medium with a second PLC network,
        wherein the transmission mode is selected to facilitate concurrent use of the PLC medium by the first PLC network and the second PLC network, and
        wherein the transmission mode is selected from a group consisting of a 2-stream multiple-input-multiple-output (MIMO) eigen-beamforming transmission mode, a 1-stream MIMO spot-beamforming transmission mode, and a 1-stream single-input-single-output (SISO) transmission mode.

16. The first device of claim 15, wherein the instructions, when executed by the processor, cause the first device to:
    determine interference associated with a plurality of receivers that communicate via the PLC medium, and
    select the transmission mode based, at least in part, on the interference.

17. The first device of claim 15, further comprising:
a transmitter configured to transmit an indicator of the transmission mode.

18. The first device of claim 17, wherein the transmitter is configured to transmit the indicator to the first device.

19. The first device of claim 17, wherein the transmitter is configured to transmit the indicator to a central coordinator of the first PLC network.

20. The first device of claim 15, wherein the instructions, when executed by the processor, cause the first device to:
determine a first path signal performance metric based, at least in part, on interference measurements associated with a first receiver of the second device;
determine a second path signal performance metric based, at least in part, on the interference measurements associated with a second receiver of the second device; and
select the 2-stream MIMO eigen-beamforming transmission mode in response to both the first path signal performance metric and the second path signal performance metric being above a first predetermined threshold associated with the 2-stream MIMO eigen-beamforming transmission mode.

21. The first device of claim 20, wherein the instructions, when executed by the processor, cause the first device to:
select the 1-stream MIMO spot-beamforming transmission mode in response to the first path signal performance metric or the second path signal performance metric being above a second predetermined threshold associated with the 1-stream MIMO spot-beamforming transmission mode.

22. The first device of claim 20, wherein the instructions, when executed by the processor, cause the first device to:
calculate a combined signal performance estimate based, at least in part, on the first path signal performance metric and the second path signal performance metric; and
select the 1-stream MIMO spot-beamforming transmission mode in response to the combined signal performance estimate being above a second predetermined threshold associated with the 1-stream MIMO spot-beamforming transmission mode.

23. A non-transitory machine-readable medium having instructions stored therein which, when executed by a processor unit in a powerline communication (PLC) network, cause the processor unit to:
select a transmission mode for a transmission from a first device to a second device via a PLC medium, the first device and the second device belonging to a first PLC network that shares the PLC medium with a second PLC network,
wherein the transmission mode is selected to facilitate concurrent use of the PLC medium by the first PLC network and the second PLC network, and
wherein the transmission mode is selected from a group consisting of a 2-stream multiple-input-multiple-output (MIMO) eigen-beamforming transmission mode, a 1-stream MIMO spot-beamforming transmission mode, and a 1-stream single-input-single-output (SISO) transmission mode.

24. The non-transitory machine-readable medium of claim 23, wherein the instructions, when executed by the processor unit, cause the processor unit to:
determine interference associated with a plurality of receivers of the second device,
wherein the transmission mode is selected based, at least in part, on the interference.

25. The non-transitory machine-readable medium of claim 23, wherein the instructions, when executed by the processor unit, cause the processor unit to:
indicate the selected transmission mode.

26. The non-transitory machine-readable medium of claim 23, wherein the instructions, when executed by the processor unit, cause the processor unit to:
determine a first path signal performance metric based, at least in part, on interference measurements associated with a first receiver of the second device; and
determine a second path signal performance metric based, at least in part, on interference measurements associated with a second receiver of the second device,
wherein the 2-stream MIMO eigen-beamforming transmission mode is selected in response to the first path signal performance metric and the second path signal performance metric being above a first predetermined threshold associated with the 2-stream MIMO eigen-beamforming transmission mode.

27. The non-transitory machine-readable medium of claim 26, wherein the instructions, when executed by the processor unit, cause the processor unit to:
calculate a combined signal performance estimate based, at least in part, on the first path signal performance metric and the second path signal performance metric,
wherein the 1-stream MIMO spot-beamforming transmission mode is selected in response to the combined signal performance estimate being above a second predetermined threshold associated with the 1-stream MIMO spot-beamforming transmission mode.

28. The non-transitory machine-readable medium of claim 27, wherein the instructions to calculate the combined signal performance estimate includes instructions which, when executed by the processor unit, cause the processor unit to perform an equal gain combining (EGC) calculation.

29. The non-transitory machine-readable medium of claim 27, wherein the instructions to calculate the combined signal performance estimate includes instructions which, when executed by the processor unit, cause the processor unit to perform maximal ration combining (MRC) calculation.

30. The non-transitory machine-readable medium of claim 23, wherein the instructions to select the transmission mode for the transmission from the first device to the second device comprises instructions which, when executed by the processor unit, cause the processor unit to:
select a first transmission mode between the first device and a third device of the first PLC network, wherein the first transmission mode comprises a SISO transmission mode; and
select a second transmission mode between the third device and the second device, wherein the second transmission mode comprises a MIMO transmission mode.

* * * * *